United States Patent [19]
Dailey, Jr.

[11] 3,786,941
[45] Jan. 22, 1974

[54] APPARATUS FOR TOBACCO HARVESTING

[76] Inventor: Louis E. Dailey, Jr., R.F.D. No. 1 Box 99A, Ahoskie, N.C. 27910

[22] Filed: Aug. 15, 1972

[21] Appl. No.: 279,539

[52] U.S. Cl............ 214/83.1, 198/179, 214/1 BA, 214/5.5, 56/27.5
[51] Int. Cl............................................. B60p 1/36
[58] Field of Search.. 198/179; 214/1 BA, 5.5, 83.1; 56/27.5

[56] References Cited
UNITED STATES PATENTS

| | | | |
|---|---|---|---|
| 2,933,206 | 4/1960 | Alphin, Jr. | 214/5.5 |
| 2,477,068 | 7/1949 | LaMotte | 198/179 X |
| 1,082,557 | 12/1913 | Rudolphi | 198/179 X |

*Primary Examiner*—Frank E. Werner
*Attorney, Agent, or Firm*—Raymond N. Matson

[57] ABSTRACT

A safety hand positioner and guard for the conveyor of harvested tobacco being passed from the workers known as breakers to the tiers which permits a new and more efficient method of harvesting by passing it rearwardly instead of forwardly of the harvesting vehicle.

3 Claims, 6 Drawing Figures

PATENTED JAN 22 1974
3,786,941
SHEET 1 OF 2
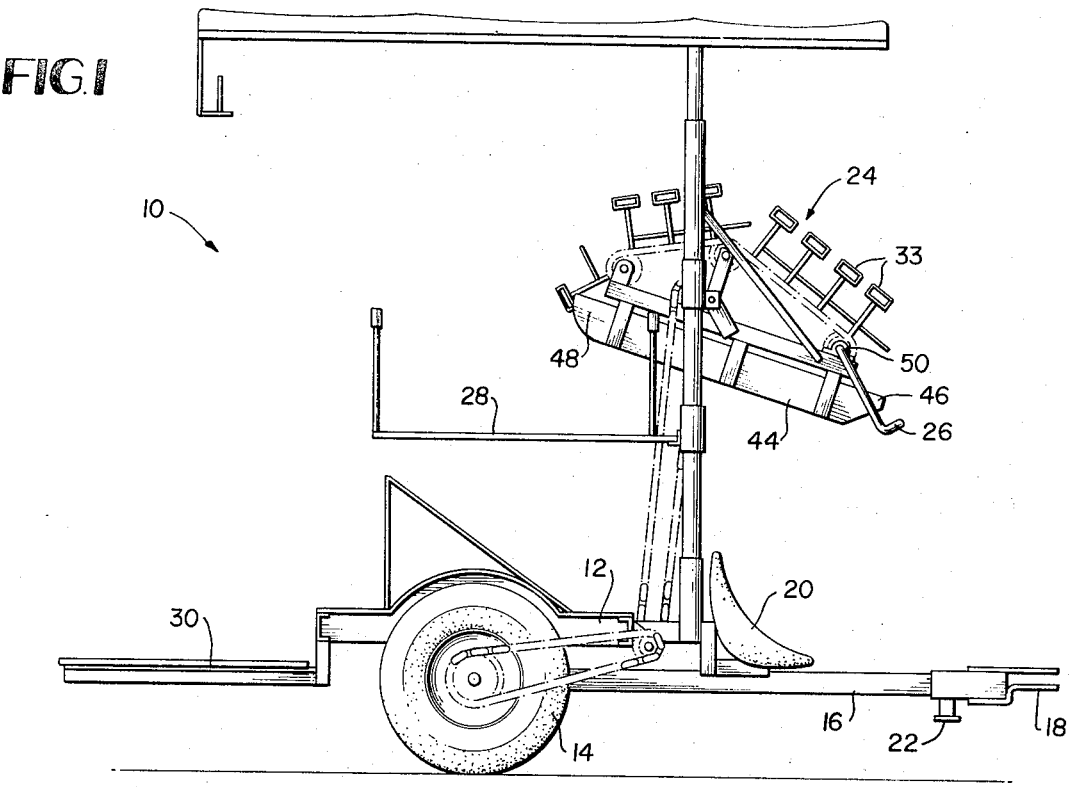
FIG.1
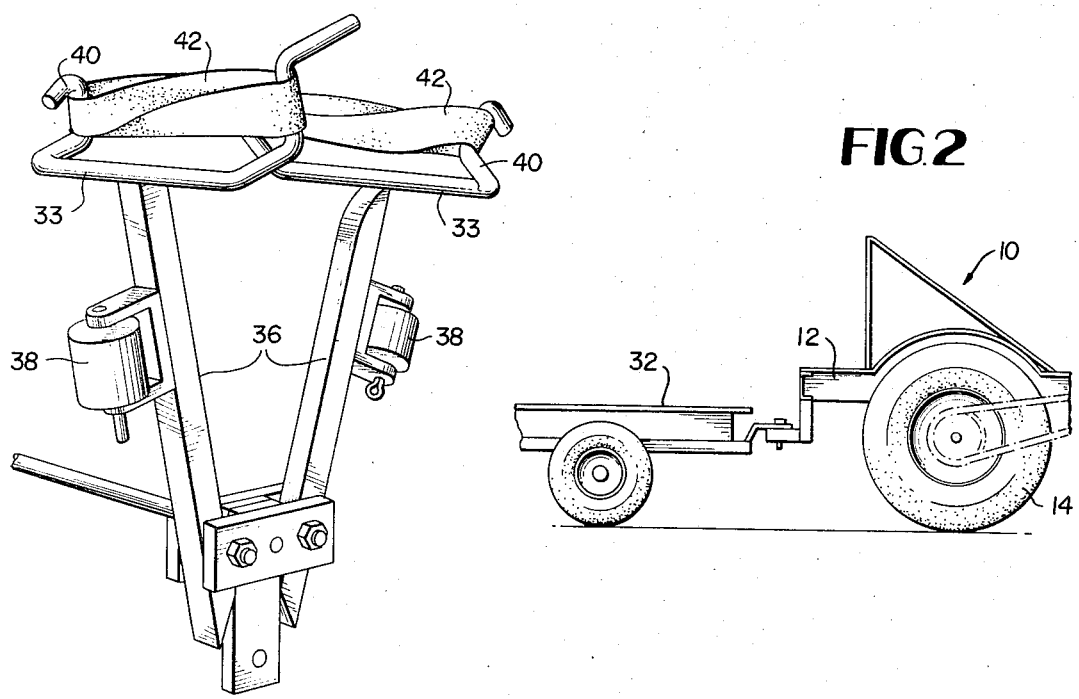
FIG.2
FIG.3

APPARATUS FOR TOBACCO HARVESTING

This invention relates generally to the harvesting of tobacco and similar plants and more particularly to an improved apparatus for and method of harvesting a crop with great efficiency.

This invention is an improvement on the harvesting method and apparatus disclosed in my co-pending application for Letters Patent, Ser. No. 106,042, filed Jan. 13, 1971 entitled Tobacco Harvesting.

As disclosed in that application, a tractor pulls the harvesting vehicle and apparatus which comprises a wheeled frame upon the rear end of which and upon opposite sides, a pair of forwardly facing seats are positioned for the tobacco breakers whose job is to break two or three ripe leaves from each plant on their side of the frame as it is pulled along.

On the front of the frame, a pallet was placed for the reception of tied tobacco leaves placed there by the tiers. The leaves are moved from the breakers to the tiers by means of a conveyor having a plurality of cooperating tobacco leaf grasping "hands". These hands successively come together adjacent the breakers and carry the leaves forwardly to the tiers where the hands release the leaves.

This forward motion of the harvested leaves on the vehicle is inefficient because when the pallet is full of tied tobacco leaves, the frame must be moved to an accessible spot, stopped, and unloaded and an empty pallet loaded on. Prior to the present invention, this inefficient forward movement was dictated as the breakers must face the plants they are approaching and they must also see exactly where the tobacco grasping hands are to avoid serious injury to their own hands.

Accordingly, the main object of the present invention is to provide an improved and more efficient apparatus for and method of harvesting tobacco leaves which will greatly expedite the harvesting of a crop, eliminate down time unloading, and thus be more economical.

An important object of the present invention is to provide a novel guard for the conveyor which will eliminate any danger to the breaker's hands and enable the tobacco leaves to be conveyed rearwardly to a readily detachable pallet or trailer.

Another important object of the present invention is to provide a new and improved method of breaking tobacco leaves and passing it rearwardly for tieing, stacking and ready unloading.

A further important object of the present invention is to provide a novel guard for a leaf conveyor mechanism which will enable a breaker to pass the leaves to the conveyor hands without looking for the hands and without injury therefrom.

Other objects and advantages of the present invention will become apparent during the course of the following description.

In the drawings, I have shown one embodiment of the invention. In this showing:

FIG. 1 is a side elevational view of the harvesting vehicle showing the improved apparatus comprising the present invention including the forward trailer hitch and the adjacent breaker's seat, the novel guard on the tobacco leaf conveyor, the tying rack for the leaves and the readily detachable tied-tobacco-leaf pallet at the rear;

FIG. 2 is a fragmentary similar view showing the use of a trailer for the tied tobacco leaves instead of a pallet;

FIG. 3 is a perspective of one of the pairs of tobacco leaf grasping hands mounted on the conveyor chain;

Figure 4:
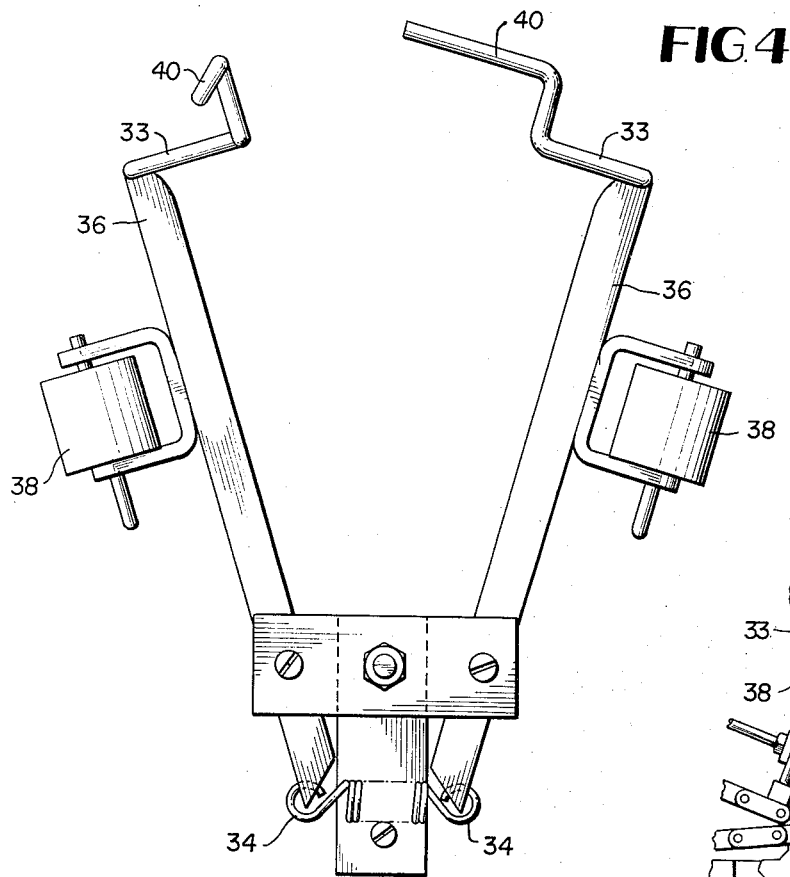
FIG. 4 is a front elevational view thereof.

Referring to the drawings, numeral 10 designates the harvesting machine as a whole which comprises a frame 12 having supporting wheels 14, a tongue 16 and trailer hitch 18, a forwardly facing breaker's seat 20 positioned on each side of the frame 12 plus a footrest 22, a tobacco leaf conveyor 24 having a hand positioner and guard 26, a rack 28 for tying tobacco leaves together, and either a readily detachable pallet 30 (FIG. 1) or a trailer 32 (FIG. 2) for receiving the tied tobacco leaves which are mounted on sticks.

As is disclosed in my co-pending application, the conveyor 24 is powered by forward motion of the vehicle by means of wheel sprockets and chains and includes a plurality of spaced U-shaped hands 33 which are urged apart adjacent their pivot points by springs 34. The hands are supported by arms 36 which have rollers 38 mounted on their outer sides and the legs 40 of the hands 33 are spanned by soft flexible bands 42 so as not to injure the tobacco leaves.

Figure 5:
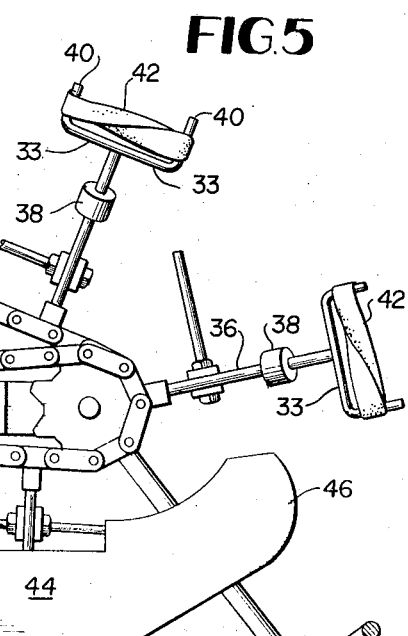
FIG. 5 is a side elevational view thereof showing a pair of hands about to enter the channel which forces them together to grasp the tobacco leaves, and the conveyor guard which protects and positions the breaker's hands.

As is shown in FIG. 5, the hands 33 are moved together to grasp the stems of tobacco leaves by means of a channel 44 having divergent entrance ends 46 and divergent exit ends 48 which permit the hands 33 to open as they leave the channel and deliver the leaves to the tiers who tie them onto sticks. As the hands 33 move clockwise about the forward end of the channels, their rollers 38 engage the divergent channel ends 46 and the hands move toward each other. It is at this time that the breakers (usually two to a machine) must insert the stem ends of the tobacco leaves to be grasped by the hands and previously, great care had to be exercised so that the breaker's hands were not caught by the conveyor hands.

Figure 6:
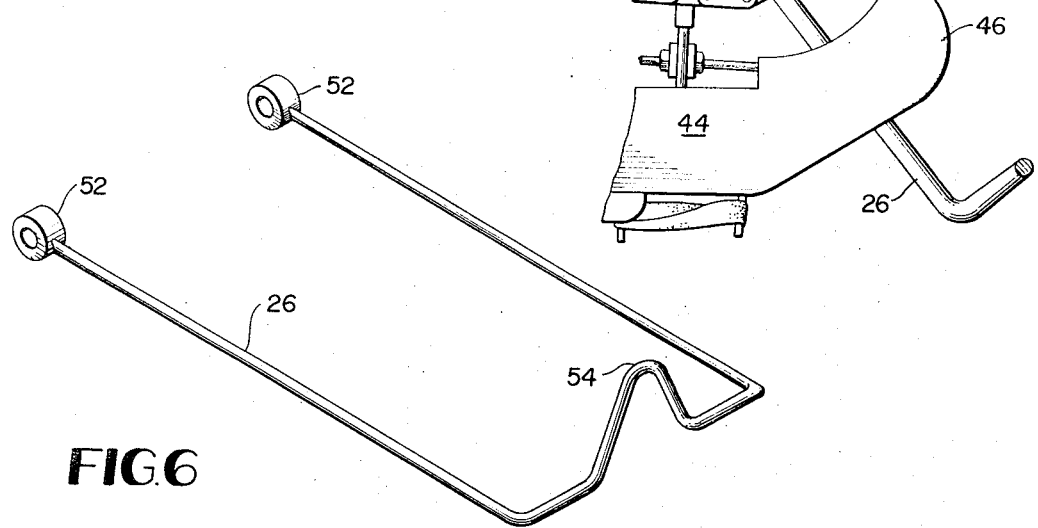
FIG. 6 is a perspective view of the novel hand positioner and guard.

An important feature of the present invention resides in the novel hand positioner and guard 26 (FIG. 6) which is a strong U-shaped wire rod which is fixed to the conveyor frame as at 50 by means of eyes 52. The guard 26 extends downwardly and forwardly from the conveyor 24 at an angle of about 45° and its outer end includes an upstanding V-shaped bend defining a hand positioning notch 54.

During harvesting, the breakers sit on the seats 20, break two or three ripe leaves from a plant and present their stems upwardly against the stationary notch 54 of the guide which their fingers may also engage as the hands 33 are passing through the guard 26 and closing on the stems of the leaves. There is a clearance between the notch 54 and the hands 33 so that injury to the breaker's hand is prevented and he need not even look at the hands to properly position the stems of the tobacco leaves.

The fact that he need not look at the hands 33 enables the conveyor to be positioned so as to extend to the rear of the breaker's seat to the tier's position adjacent the tobacco tying rack 28 and thus enables the improved and more efficient method of passing tobacco rearwardly as disclosed herein. The tier receives the tobacco leaves from the conveyor 24 and ties it on the sticks which are placed on the pallet or trailer when full. When the latter are full, they readily are removed and replaced without stopping the harvesting operation.

It is to be understood that the method of and form of the apparatus herewith shown and described are to be taken as preferred examples of the same and that various changes in the shape, size and arrangement of parts may be resorted to without departure from the spirit of the invention or the scope of the subjoined claims.

What is claimed is:

1. A mobile tobacco harvesting machine having a frame and supporting wheels for movement between rows of tobacco plants comprising, in combination, at least one forwardly facing leaf breaker's seat positioned on the forward portion of said frame at plant height and a tier's platform extending directly to the rear thereof; an endless conveyor for tobacco leaves harvested by a breaker, positioned adjacent to and extending from above and directly rearwardly of said breaker's seat and having hands movable toward and away from each other to alternately grasp tobacco leaves from said breaker's hands, carry them directly rearwardly, and directly release the leaves to a tier for deposit on said frame; and means for effecting the gripping and releasing movement of said hands of said conveyor comprising a channel having divergent ends, and rollers mounted on said hands and engageable with said channel to move said hands toward and away from each other.

2. A mobile tobacco harvesting machine having a frame and supporting wheels for movement between rows of tobacco plants comprising, in combination, at least one seat positioned on the forward portion of said frame; an endless conveyor for harvested tobacco leaves positioned adjacent and extending rearwardly of said seat and having hands movable toward and away from each other to alternately grasp tobacco leaves, carry them rearwardly, and release the leaves and deposit them on said frame; means for effecting the movement of said hands of said conveyor comprising a channel having divergent ends, and rollers mounted on said hands and engageable with said channel to move said hands toward each other; and means mounted on said conveyor adjacent the closing position of said hands to guide the feeding of the stems of tobacco leaves thereto; said means including a notch to guide the feeding of the stems of tobacco leaves to said hands.

3. A mobile tobacco harvesting machine having a frame and supporting wheels for movement between rows of tobacco plants comprising, in combination, at least one seat positioned on the forward portion of said frame; an endless conveyor for harvested tobacco leaves positioned adjacent and extending rearwardly of said seat and having hands movable toward and away from each other to alternately grasp tobacco leaves, carry them rearwardly, and release the leaves and deposit them on said frame; means for effecting the movement of said hands of said conveyor comprising a channel having divergent ends, and rollers mounted on said hands and engageable with said channel to move said hands toward each other, and guard means fixed to said conveyor adjacent the closing position of said hands to prevent injury to the hands of a harvest worker, said guard means including a notch to guide the feeding of the stems of tobacco leaves to said hands.

* * * * *